(12) United States Patent
Kaneko

(10) Patent No.: US 6,841,899 B2
(45) Date of Patent: Jan. 11, 2005

(54) ACTUATOR, ACTUATOR DRIVING METHOD, AND ATCUATOR SYSTEM

(75) Inventor: Shinji Kaneko, Kokubunji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/808,670

(22) Filed: Mar. 25, 2004

(65) Prior Publication Data

US 2004/0201443 A1 Oct. 14, 2004

(30) Foreign Application Priority Data

Mar. 31, 2003 (JP) ........................................ 2003-096160

(51) Int. Cl.$^7$ .................... H02K 41/00; H02K 33/00; H01L 41/04
(52) U.S. Cl. .................... 310/12; 310/15; 310/311; 310/313 R; 310/323.02; 310/323.18
(58) Field of Search .................... 310/12, 15, 26, 310/311, 313 R, 323.02, 323.18; 335/215

(56) References Cited

U.S. PATENT DOCUMENTS 5,448,127 A * 9/1995 Kanazawa ............. 310/323.06
5,632,074 A * 5/1997 Kanazawa ............. 29/25.35
6,724,128 B2 * 4/2004 Cheng et al. ............. 310/328
6,765,335 B2 * 7/2004 Wischnewskiy ....... 310/323.02

FOREIGN PATENT DOCUMENTS

| JP | 5-026149 | 2/1993 |
| JP | 10-206457 | 8/1998 |
| JP | 2000-253683 | 9/2000 |

* cited by examiner

Primary Examiner—Ramon M. Barrera
(74) Attorney, Agent, or Firm—Scully, Scott, Murphy & Presser

(57) ABSTRACT

A potential difference is applied between a movable electrode disposed a facing surface of a movable member, which the facing surface confronts a substrate extended in a predetermined direction or a vibrating member supported on the substrate vibratably in the predetermined direction, and a counter electrode disposed on the substrate or the vibrating member so as to confront the movable electrode. The applied potential difference causes an electrostatic force to act such that an apparent friction between the vibrating member and the movable member is greater than an apparent friction between the substrate and the movable member when displacing the vibrating member in a desired direction relatively on the substrate by vibrating in the predetermined direction, and thereby the movable member is relatively moved in the desired direction on the substrate.

23 Claims, 11 Drawing Sheets

ACTUATOR, ACTUATOR DRIVING METHOD, AND ATCUATOR SYSTEM

CROSS-REFERENCE TO RELATED APPLICATIONS

This application is based upon and claims the benefit of priority from prior Japanese Patent Application No. 2003-096160, filed Mar. 31, 2003, the entire contents of which are incorporated herein by reference.

BACKGROUND OF THE INVENTION

1. Field of the Invention

The present invention relates to an actuator driven by step advance, a method of driving the actuator, and an actuator system including such an actuator.

2. Description of the Related Art

A digital camera is incorporated in a cellular phone or personal digital assistant, and an image taking optical module is demanded to be much smaller in size. Accordingly, in place of a conventional electromagnetic actuator, an electrostatic actuator is proposed.

For example, Jpn. Pat. Appln. KOKAI Publication No. 5-26149 proposes an object driving apparatus comprising a first contact part having first static electricity applying means connected to a first conductor thereof, and configured so that a first dielectric element covering the surface of the first conductor contacts with the contact surface, a second contact part having second static electricity applying means connected to a second conductor thereof, and configured so that a second dielectric element covering the surface of the second conductor contacts with the contact surface, and an expandable material for coupling the first conductor and second conductor. In synchronism with expansion and contraction of the expandable material, the first static electricity applying means and second static electricity applying means invert to each other so as to be capable of moving substantially in the horizontal direction to the contact surface. That is, this Jpn. Pat. Appln. KOKAI Publication No. 5-26149 discloses a configuration of forming a contact part of large frictional force and a contact part of small force intentionally, coupling them with an expandable material, and moving the two contact parts in the same direction by inverting the magnitude relation of the frictional force in synchronism with expansion and contraction of the expandable material.

Further, Jpn. Pat. Appln. KOKAI Publication No. 2000-253683 discloses an inchworm mechanism comprising a support element, a mobile element capable of relatively moving on the support element, a driving element existing at a position close to the mobile element, expanding means for displacing the driving element relatively to the support element, and an electrostatic clamping mechanism for clamping and driving the mobile element and driving element.

BRIEF SUMMARY OF THE INVENTION

According to a first aspect of the present invention, there is provided an actuator comprises: a substrate extended in a predetermined direction; a vibrating member supported on the substrate vibratably in the predetermined direction; a vibration generating portion configured to vibrate the vibrating member in the predetermined direction; a movable member having a first facing surface confronting the substrate and a second facing surface confronting the vibrating member; a movable electrode disposed at any one of the first facing surface and second facing surface of the movable member; and a counter electrode disposed on any one of the substrate and the vibrating member so as to confront the movable electrode. A potential difference is applied between the movable electrode and the counter electrode to cause an electrostatic force to act such that an apparent friction between the vibrating member and the movable member is greater than an apparent friction between the substrate and the movable member when displacing the vibrating member in a desired direction relatively on the substrate by vibrating in the predetermined direction, and thereby the movable member is relatively moved in the desired direction on the substrate.

According to a second aspect of the present invention, there is provided an actuator comprises: a substrate extended in a predetermined direction; a vibrating member supported on the substrate vibratably in the predetermined direction; a vibration generating portion configured to vibrate the vibrating member in the predetermined direction; a movable member having a first facing surface confronting the substrate and a second facing surface confronting the vibrating member; a movable electrode disposed at any one of the first facing surface and second facing surface of the movable member; and a counter electrode disposed on any one of the substrate and the vibrating member so as to confront the movable electrode. A potential difference is applied between the movable electrode and the counter electrode in synchronism with the vibration of the vibrating member, and by using the generated electrostatic force, the movable member is moved relatively on the substrate in a desired direction.

According to a third aspect of the present invention, there is provided an actuator comprises: a substrate extended in a predetermined direction; a vibrating member supported on the substrate vibratably in the predetermined direction; a vibration generating portion configured to vibrate the vibrating member in the predetermined direction; a movable member having a first facing surface confronting the substrate and a second facing surface confronting the vibrating member; movable electrodes disposed at the first and second facing surfaces of the movable member; a first counter electrode disposed on the substrate so as to confront the movable electrode; and a second counter electrode disposed on the vibrating member so as to confront the movable electrode. A potential difference is applied between the movable electrode and the first and second counter electrodes to cause an electrostatic force to act such that an apparent friction between the vibrating member and the movable member is greater than an apparent friction between the substrate and the movable member when displacing the vibrating member in a desired direction relatively on the substrate by vibrating in the predetermined direction, and thereby the movable member is relatively moved in the desired direction on the substrate.

According to a fourth aspect of the present invention, there is provided a driving method of an actuator, the actuator including a movable electrode disposed on a movable member, and a counter electrode disposed at any one of a facing surface of a substrate having the facing surface confronting the movable member and a facing surface of a vibrating member having the facing surface confronting the movable electrode and vibrating in a predetermined direction, applying a voltage to the movable electrode and the counter electrode, thereby causing the movable member to move relatively on the substrate. The driving method comprises: displacing the vibrating member in a desired direction relatively on the substrate; and applying a potential difference between the movable electrode and the counter electrode such that an apparent friction between the vibrating member and the movable member is greater than an apparent friction between the substrate and the movable member when displacing the vibrating member relatively.

According to a fifth aspect of the present invention, there is provided a driving method of an actuator, the actuator applying a controlled voltage to a movable electrode disposed on a movable member, a first counter electrode disposed at a facing surface of the substrate having the facing surface confronting the movable electrode, and a second counter electrode disposed at a facing surface of the vibrating member having the facing surface confronting the movable electrode and vibrating in a predetermined direction, thereby causing the movable member to move relatively on the substrate. The driving method comprises: displacing the vibrating member in a desired direction relatively on the substrate; and applying a potential difference between at least the second counter electrode and the movable electrode when displacing the vibrating member relatively.

Advantages of the invention will be set forth in the description which follows, and in part will be obvious from the description, or may be learned by practice of the invention. Advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the invention will be specifically described below while referring to the accompanying drawings.

[First Embodiment]

Figure 1:
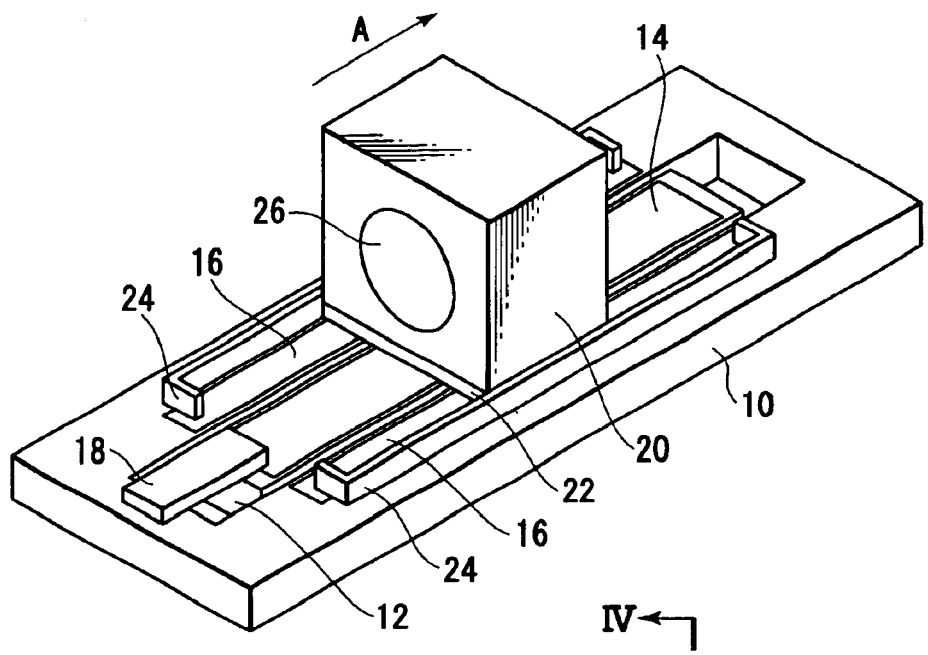
FIG. 1 is a perspective view showing a configuration of an actuator according to a first embodiment of the invention.

An actuator according to a first embodiment of the invention has an opening provided in a fixed substrate 10 functioning as a fixed rail as shown in FIG. 1. A vibrating member 12 functioning as a vibrating rail is disposed in this opening at a slight interval, so that it is supported vibratably in a predetermined direction in the fixed substrate 10. On the top of the vibrating member 12, a vibrating electrode 14 is formed as a second counter electrode, while a fixed electrode 16 is formed as a first counter electrode on the top of the fixed substrate 10 at both flanks of the vibrating electrode 14. The fixed substrate 10 and vibrating member 12 are coupled together by a laminated piezoelectric vibrator 18. A movable member 20 is disposed so as to straddle over the fixed electrode 16 and vibrating electrode 14. Of the movable member 20, at least the surface facing the fixed substrate 10 and the surface facing the vibrating member 12, that is, the bottom in this example are covered with a metal coating film as a movable electrode 22. The movable member 20 is restrained by a guide rail 24 formed on the fixed substrate 10, and is vibratable in a fixed range in the direction of arrow A in the drawing. In the center of the movable member 20, a circular opening 26 is formed, and a lens (not shown) is fixed in its inside. Although not shown in the drawing, wirings are drawn out from the fixed electrode 16, vibrating electrode 14, and metal coating films or movable electrode 22, and by applying and controlling voltages independently by an external power source, a potential difference can be applied between different electrodes.

Figure 2:
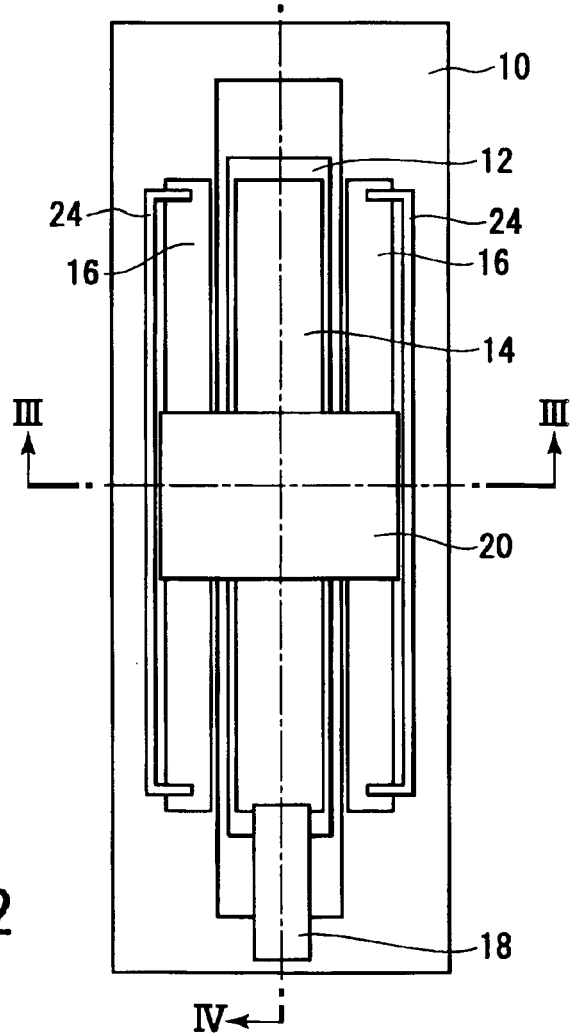
FIG. 2 is a top view of the actuator according to the first embodiment.
Figure 3:
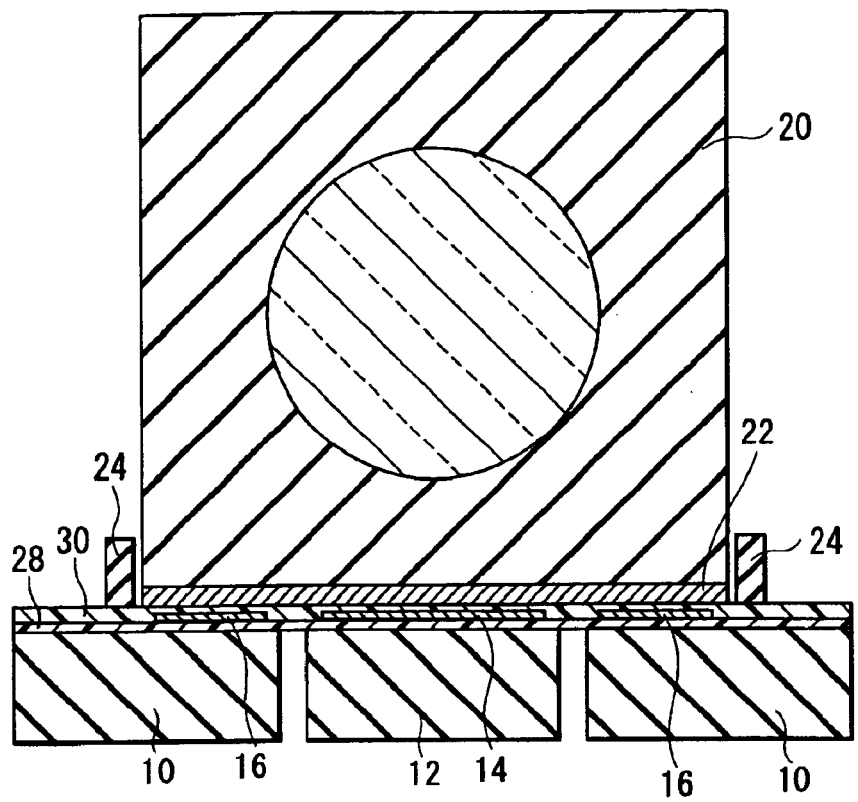
FIG. 3 is a sectional view taken along line III—III in FIG. 2.
Figure 4:
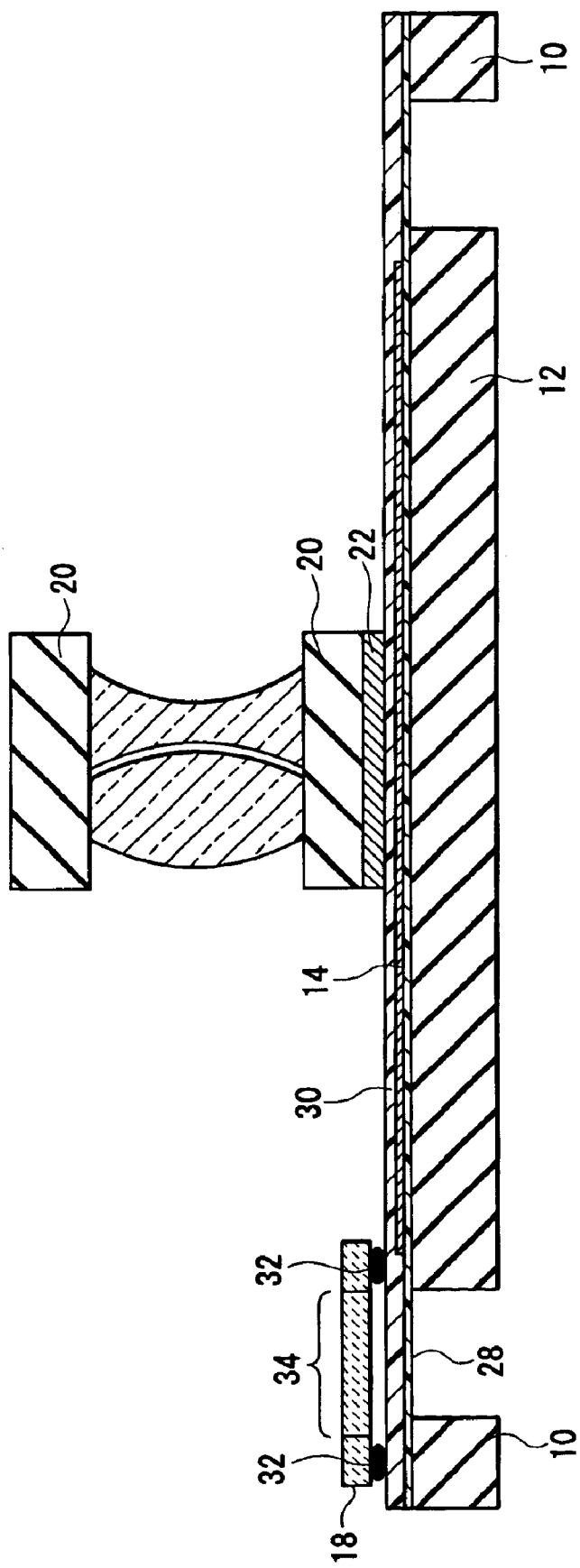
FIG. 4 is a sectional view taken along line IV—IV in FIG. 2.

FIG. 2 is a top view of the actuator according to the embodiment, and a sectional view taken along line III—III in the drawing is shown in FIG. 3, and a sectional view taken along line IV—IV is shown in FIG. 4. That is, as shown in FIGS. 2 and 3, the fixed substrate 10 and vibrating member 12 are coupled by an insulating lower layer resin thin film 28 and an insulating upper layer resin thin film 30 formed on the upper part of the both. The vibrating electrode 14 and fixed electrode 16 are formed between the lower layer resin thin film 28 and the upper layer resin thin film 30. Therefore, a metal coating film, that is, the movable electrode 22 in the bottom of the movable member 20 opposes the vibrating electrode 14 and fixed electrode 16 by way of the upper layer resin thin film 30. The lower layer resin thin film 28 electrically insulates between the vibrating member 12 from the vibrating electrode 14, and the fixed substrate 10 from the fixed electrode 16, respectively. Further, the upper layer resin thin film 30 electrically insulates the metal coating film or the movable electrode 22 from the vibrating electrode 14 and fixed electrode 16.

As shown in FIG. 4, the laminated piezoelectric vibrator 18 has its both ends adhered to the vibrating member 12 and fixed substrate 10 by an adhesive member 32. The piezoelectric vibrator 18 vibrates in the lateral direction in the drawing only in a region 34 in FIG. 4. Although not shown in the drawing, the piezoelectric vibrator 18 has a lead wire for applying voltage for vibrating itself drawn out and connected to the external power source. When a voltage of 45 V is applied to the piezoelectric vibrator 18, it contracts by 1 micron in the lateral direction in FIG. 4 as compared with the state without voltage applied to the piezoelectric vibrator 18. The voltage-applied state is called the contracted state, and the no-voltage state is called the expanded state. The laminated piezoelectric vibrator 18, which is a piezoelectric element having such characteristic, is designed to vibrate by repeated contraction and expansion by changing the voltage-applied state repeatedly.

In the actuator of the embodiment, the piezoelectric vibrator 18 is vibrated by applying voltage pulses, and the vibrating member 12 vibrates slightly against the fixed substrate 10. Herein, the rigidity of the lower layer resin thin film 28 and upper layer resin thin film 30 is sufficiently small, and does not disturb the vibration of the vibrating member 12.

Figure 5:
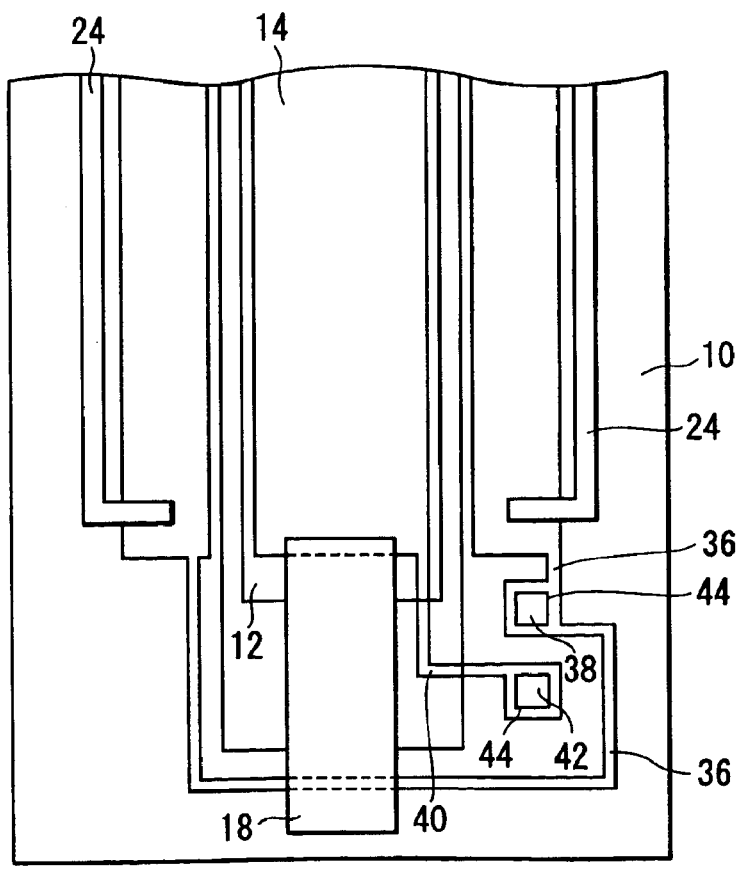
FIG. 5 is a diagram explaining a method of drawing wiring of the actuator according to the first embodiment.

Drawing-out of the wiring of the actuator in the embodiment which is not shown in FIGS. 1 to 4 for the sake of simplicity will be explained by referring to FIG. 5. That is, a wiring 36 is drawn out from the fixed electrode 16, and the fixed electrode 16 is connected to an electrode pad 38 by the wiring 36. Further, a wiring 40 is drawn out from the vibrating electrode 14, and the vibrating electrode 14 is connected to an electrode pad 42 in the region on the fixed substrate 10 by the wiring 40. The wirings 36, 40 and electrode pads 38, 42 are disposed between the lower layer resin thin film 28 and the upper layer resin thin film 30 same as the fixed electrode 16 and vibrating electrode 14. An opening 44 is formed in the upper layer region thin film 30 in the region of the electrode pads 38, 42. Conductors of the electrode pads 38, 42 are exposed from the opening 44, and external lead wires can be connected. Thus, the electrode pad 42 from the vibrating electrode 14 is passed between the resin thin films 28, 30 supporting the vibrating member 12 on the fixed substrate 10, and the electrode pad 38 of the fixed electrode is disposed closely on the fixed substrate 10, so that the wiring is distributed neatly.

A method of driving the actuator according to the first embodiment of the invention will be explained by referring to FIG. 6. This diagram shows the voltage of the vibrating electrode 14, voltage of the fixed electrode 16, voltage applied to the piezoelectric vibrator 18, and potential of the movable electrode 22. In this embodiment, a pulse voltage of specific period is applied to the piezoelectric vibrator 18. A square wave of specific period synchronized with the voltage of the piezoelectric vibrator 18 is applied to the fixed electrode 16 and vibrating electrode 14. The voltage pulse of the fixed electrode 16 and the voltage pulse of the vibrating electrode 14 are reverse in phase to each other.

A case of advancement of the movable member 20 will be explained. Advancement is the movement in the arrow A direction in FIG. 1. To advance the movable member 20, the voltage of the movable electrode 22 is fixed at 45 V. This operation will be explained below.

In the process from time t0 to time t1, the applied voltage of the piezoelectric vibrator 18 changes from 0 V to 45 V. As a result, the piezoelectric vibrator 18 changes from the expanded state to the contacted state, and the vibrating member 12 is displaced by this changing portion. At this time, the voltages of the vibrating electrode 14, fixed electrode 16, and movable electrode 22 are respectively 45 V, 0 V, and 45 V. Therefore, an electrostatic force acts between the movable electrode 22 and the fixed electrode 16, and the movable electrode 22 is attracted to the fixed electrode 16. Accordingly, the friction between the movable member 20 and the fixed substrate 10 becomes greater than the friction between the movable member 20 and the vibrating member 12. Even if the vibrating member 12 is displaced, hence, the movable member 20 is not displaced from the fixed substrate 10.

In the process from time t1 to time t2, since the applied voltage of the piezoelectric vibrator 18 is not changed, the piezoelectric vibrator 18 remains in the contracted state. The voltages of the vibrating electrode 14, fixed electrode 16, and movable electrode 22 are respectively 0 V, 45 V, and 45 V, so that an electrostatic force acts between the movable electrode 22 and the vibrating electrode 14, and the movable electrode 22 is attracted to the vibrating electrode 14.

In the process from time t2 to time t3, since the applied voltage of the piezoelectric vibrator 18 changes from 45 V to 0 V, the piezoelectric vibrator 18 changes from the contracted state to the expanded state, and the vibrating member 12 is displaced by this changing portion. At this time, the voltage of the vibrating electrode 14, fixed electrode 16, and movable electrode 22 is not changed, so that the movable electrode 22 remains attracted to the vibrating electrode 14. Accordingly, the friction between the movable member 20 and the vibrating member 12 becomes greater than the friction between the movable member 20 and the fixed substrate 10. Therefore the movable member 20 is displaced together with the vibrating member 12, and is displaced from the fixed substrate 10 by about 1 micron in the direction of arrow A in FIG. 1.

In the process from time t3 to time t4, since the applied voltage of the piezoelectric vibrator 18 is not changed, it remains in the expanded state. The voltages of the vibrating electrode 14, fixed electrode 16, and movable electrode 22 are respectively 45 V, 0 V, and 45 V, so that an electrostatic force acts between the movable electrode 22 and the vibrating electrode 14, and the movable electrode 22 is attracted to the fixed electrode 16.

The state at time t4 is same as the state at time t0, and hence the next process is same as the process from time t0 to time t1. Therefore, by periodically repeating the process from time t0 to time t4, the movable member 20 can be advanced from the fixed substrate 10 in the direction of arrow A in FIG. 1.

Thus, in synchronism with the vibration of the piezoelectric vibrator 18, voltage pulses are applied to the fixed electrode 16 and vibrating electrode 14 in mutually reverse phases, and a specific voltage (45 V in this case) is applied to the movable electrode 22 so as to be attracted to the vibrating electrode 14 when the piezoelectric vibrator 18 is changed from expanded state to contracted state, thereby driving in the reverse direction of the arrow A in FIG. 1.

Next, a case of retreat of the movable member 20 will be explained. Retreat is the movement in the reverse direction of arrow A in FIG. 1. To retreat the movable member 20, the voltage of the movable electrode 22 is kept constant at 0 V. This operation will be explained below.

In the process from time t0 to time t1, since the applied voltage of the piezoelectric vibrator 18 changes from 0 V to 45 V, the piezoelectric vibrator 18 changes from the expanded state to the contacted state, and the vibrating member 12 is displaced by this changing portion. At this time, the voltages of the vibrating electrode 14, fixed electrode 16, and movable electrode 22 are respectively 45 V, 0 V, and 0 V, so that an electrostatic force acts between the movable electrode 22 and the vibrating electrode 14, and the movable electrode 22 is attracted to the vibrating electrode 14. Accordingly, the friction between the movable member 20 and the vibrating member 12 becomes greater than the friction between the movable member 20 and the fixed substrate 10, and hence the movable member 20 is displaced together with the vibrating member 12, and is displaced from the fixed substrate 10 by about 1 micron in the reverse direction of arrow A in FIG. 1.

In the process from time t1 to time t2, the applied voltage of the piezoelectric vibrator 18 is not changed, and it remains in the contracted state, and the voltages of the vibrating electrode 14, fixed electrode 16, and movable electrode 22 are respectively 0 V, 45 V, and 0 V. Therefore, an electrostatic force acts between the movable electrode 22 and the fixed electrode 16, and the movable electrode 22 is attracted to the fixed electrode 16.

In the process from time t2 to time t3, since the applied voltage of the piezoelectric vibrator 18 changes from 45 V to 0 V, the piezoelectric vibrator 18 changes from the contracted state to the expanded state, and the vibrating member 12 is displaced by this changing portion. At this time, the voltages of the vibrating electrode 14, fixed electrode 16, and movable electrode 22 are not changed, so that the movable electrode 22 remains attracted to the fixed electrode 16. Accordingly, the friction between the movable member 20 and the fixed substrate 10 becomes greater than the friction between the movable member 20 and the vibrating member 12. As a result, even if the vibrating member 12 is displaced, the movable member 20 is hardly displaced from the fixed substrate 10.

In the process from time t3 to time t4, the applied voltage of the piezoelectric vibrator 18 is not changed, and it remains in the expanded state, and the voltages of the vibrating electrode 14, fixed electrode 16, and movable electrode 22 are respectively 45 V, 0 V, and 0 V. Therefore, an electrostatic force acts between the movable electrode 22 and the vibrating electrode 14, and the movable electrode 22 is attracted to the vibrating electrode 14.

The state at time t4 is same as the state at time t0, and hence the next process is same as the process from time t0 to time t1. Therefore, by periodically repeating the process from time t0 to time t4, the movable member 20 can be driven in the reverse direction of the arrow A in FIG. 1 with respect to the fixed substrate 10.

Thus, in synchronism with the vibration of the piezoelectric vibrator 18, voltage pulses are applied to the fixed electrode 16 and vibrating electrode 14 in mutually reverse phases, and a specific voltage (0 V in this case) is applied to the movable electrode 22 so as to be attracted to the vibrating electrode 14 when the piezoelectric vibrator 18 is changed from expanded state to contracted state, thereby driving in the reverse direction of the arrow A in FIG. 1.

A case of stopping the movable member 20 will be explained. In this case, the same voltage pulse as in the vibrating electrode 14 is applied to the movable electrode 22, and the voltage between the movable electrode 22 and the fixed electrode 16 is always 45 V except for a very short period of transition. Therefore, an electrostatic force is almost always acting between the movable electrode 22 and the fixed electrode 16, while an electrostatic force does not act between the movable electrode 22 and the vibrating electrode 14. Accordingly, an apparent friction between the movable member 20 and the fixed substrate 10 becomes greater than an apparent friction between the movable member 20 and the vibrating member 12. Hence, even if the vibrating member 12 vibrates, the movable member 20 is attracted to the fixed substrate 10 and remains stopped still on the fixed substrate 10.

Herein, the apparent friction may include, aside from the resistance by electrostatic force, frictional resistance between the movable member 20 or movable electrode 22 or insulator film (not shown) covering the movable electrode 22, and the fixed substrate 10 or vibrating member 12 or counter electrode (vibrating electrode 14 or fixed electrode 16) or insulator (upper layer resin thin film 30) covering the counter electrode, or other frictional resistance.

To the contrary, when the same voltage pulse as in the fixed electrode 16 is applied to the movable electrode 22, the voltage between the movable electrode 22 and the vibrating electrode 14 is always 45 V except for a very short period of transition. Therefore, an electrostatic force is almost always acting between the movable electrode 22 and the vibrating electrode 14, while an electrostatic force does not act between the movable electrode 22 and the fixed electrode 16. Accordingly, in this case, the movable member 20 is attracted to the vibrating member 12, and only vibrates together with the vibrating member 12 in amplitude of 1 micron, and hence is not driven by steps. Therefore, in an application where such vibration has no actual ill effect, the movable member 20 can be substantially stopped.

Thus, by vibrating the piezoelectric vibrator 18 steadily and applying mutually reverse phase pulses to the fixed electrode 16 and vibrating electrode 14 in synchronism with the vibration of the piezoelectric vibrator 18, the voltage applied to the movable electrode 22 is controlled so as to advance or retreat. By applying the same voltage pulse as in the fixed electrode 16 to the movable electrode 22, the movable member 20 can be stopped.

Since the vibrating electrode 14 and fixed electrode 16 are extended parallel in the moving direction of the movable member 20, along with the movement of the movable member 20, the facing area of the bottom of the movable member 20 and fixed electrode 16 and the facing area of the bottom of the movable member 20 and vibrating electrode 14 are not changed. Therefore, the electrostatic force between the movable electrode 22 and the vibrating electrode 14 or fixed electrode 16 does not depend on the position of the movable member 20, so that stable driving is realized. The movable range of the movable member 20 is determined by the length of the vibrating electrode 14 and fixed electrode 16, and is not limited by the size of the movable member 20.

In this embodiment, the applied voltage of the piezoelectric vibrator 18 is 45 V, the amplitude of the voltage pulse of the fixed electrode 16 and vibrating electrode 14 is 45 V, and the applied voltage of the movable electrode 22 is 0 V or 45 V, or a voltage pulse with amplitude of 45 V. However, needless to say, these voltage values may be varied in accordance with the characteristics of the piezoelectric vibrator 18, size or mass of the movable member 20, and other conditions.

In the embodiment, the voltage pulse of the vibrating electrode 14 and the voltage pulse of the fixed electrode 16 are completely in reverse phase. However, by slightly deviating the changing time of both voltages, it may be possible to avoid the phenomenon of decrease of electrostatic force of the movable electrode 22 acting on the fixed electrode 16 or vibrating electrode 14 in a very short time when the voltages of the vibrating electrode 14 and fixed electrode 16 change, or the applied voltage pulse to the piezoelectric vibrator 18 may be modified into sinusoidal wave or square wave, or other changes are possible within a scope not departing from the driving process. Therefore, if the magnitude relation of the apparent friction between the movable member 20 and the vibrating member 12 and the apparent friction between the movable member 20 and the fixed substrate 10 can be controlled in synchronism with the vibration of the vibrating member 12, at least one of the fixed electrode 16 and vibrating electrode 14 and the movable electrode 22 on the facing surface of the movable member 20 may be formed.

Further, by designing to allow a moment of zero potential difference between the movable electrode 22 and the counter electrode disposed on the facing surface, that is, the fixed electrode 16 or vibrating electrode 14, the electrostatic force acting between the movable electrode and one of the counter electrodes is zero, and the difference in the apparent friction can be increased, so that more preferable driving may be realized.

In the embodiment, the fixed substrate 10 is disposed so as to enclose the vibrating member 12 at both sides of the vibrating member 12 in a direction orthogonal to the vibrating direction of the vibrating member 12 on the fixed substrate surface. However, the fixed substrate 10 is not always required to be disposed at both sides of the vibrating member 12, but may be disposed at one side only. It may be also disposed above or beside the movable member 20 or any other position as long as it is extended in the predetermined vibrating direction of the vibrating member 12 and the magnitude relation of the apparent friction between the movable member 20 and vibrating member 12 and the apparent friction between the movable member 20 and fixed substrate 10 can be controlled in synchronism with the vibration of the vibrating member 12.

The movable member 20 does not always require to have the opening 26 or lens. The guider rail 24 for supporting the movable member 20 is not always required. Instead of disposing the guide rail 24, the fixed substrate 10 may be disposed so as to restrain or support the movable member 20. At least one of the movable electrode 22 and the confronting electrodes 14, 16 may be covered with an insulator.

The movable electrode 22 is not always required to cover the entire bottom of the movable member 20 as in the drawing. Further, the vibrating electrode 14 and fixed electrode 16 are designed such that their combined width is substantially equal to the width of the movable member 20, but as long as facing the movable electrode 22, it is not required to cover substantially the entire width of the movable member 20. In FIG. 3, the movable electrode 22 is disposed only in the bottom of the movable member 20, but it may be extended to the side or top, so that the wiring for applying potential to the movable electrode 22 may be drawn out more easily. Or, the wiring may be passed inside of the movable member 20 to apply a potential to the movable electrode 22. By thus modifying the movable electrode 22 or movable member 20, the wiring can be drawn out from a position not disturbing the move of the movable member 20. The movable member 20 itself may be entirely covered with a metal coating film to function as an electrode.

The movable member 20, fixed substrate 10 and vibrating member 12 are desired to contact with each other, but they may be set apart, as long as electrostatic force necessary for driving is obtained. At this time, in a range not to induce discharge from the electrode, it is not required to be covered with an insulator such as the resin thin film 30.

As explained herein, according to the embodiment, the movable member 20 is displaced only in the running direction in a state contacting with the fixed substrate 10 and vibrating member 12. As compared with a conventional electrostatic actuator which is displaced while repeating attraction to the facing upper and lower electrodes, the distance between operating electrodes is shorter, and a movable member of a greater mass can be driven by the same voltage. In addition, in the embodiment, the actuator has only one movable member 20, but since displacement of the movable member can be controlled by the voltage of the movable member only, plural movable members may be disposed on the same fixed electrode 16 and vibrating electrode 14 and can be driven independently. Also in this case, the piezoelectric vibrator 18 is not required in a plurality, and therefore even if plural movable members are used, the actuator is not increased so much in size, and the power consumption does not increase in proportion to the number of movable elements.

To stop the movable member 20, alternatively, the voltage pulse applied to the piezoelectric vibrator 18 may be suspended to stop the vibrating member 12. In this case, the voltage of the movable electrode 22 may be any one of the time of advancing, retreating or stopping as shown in FIG. 6. Anyway, except for a very short time of fluctuation of voltage pulse, the movable electrode 22 is attracted to the vibrating electrode 14 or fixed electrode 16, so that the movable member 20 is stopped still on the fixed substrate 10.

[Second Embodiment]

An actuator according to a second embodiment of the invention is similar to the actuator of the first embodiment in configuration, and only different in the driving method. A method of driving the actuator of this embodiment will be explained below by referring to FIG. 7. The diagram shows the voltage of the fixed electrode 16, vibrating electrode 14 and movable electrode 22, and the voltage applied to the piezoelectric vibrator 18. In this embodiment, a specific pulse voltage is applied to the piezoelectric vibrator 18, 45 V is applied to the fixed electrode 16, and a specific voltage of 0 V is applied to the vibrating electrode 14. In the movable electrode 22, a square wave synchronized with the voltage of the piezoelectric vibrator 18 is applied, and its phase differs with the running direction of the movable member.

A case of advancement of the movable member 20 will be explained. Advancement is the movement in the arrow A direction in FIG. 1. To advance the movable member 20, the voltage of the movable electrode 22 is 45 V in the process of increasing the applied voltage of the piezoelectric vibrator 18, and the voltage of the movable electrode 22 is 0 V in the process of decreasing the applied voltage of the piezoelectric vibrator 18. This operation will be explained below.

In the process from time t0 to time t1, since the applied voltage of the piezoelectric vibrator 18 changes from 0 V to 45 V, the piezoelectric vibrator 18 changes from the expanded state to the contacted state, and the vibrating member 12 is displaced by this changing portion. At this time, the voltages of the vibrating electrode 14, fixed electrode 16, and movable electrode 22 are respectively 45 V, 0 V, and 45 V, so that an electrostatic force acts between the movable electrode 22 and the fixed electrode 16, and the movable electrode 22 is attracted to the fixed electrode 16. Accordingly, the friction between the movable member 20 and the fixed substrate 10 becomes greater than the friction between the movable member 20 and the vibrating member 12. Therefore, even if the vibrating member 12 is displaced, the movable member 20 is not displaced from the fixed substrate 10.

In the process from time t1 to time t2, the applied voltage of the piezoelectric vibrator 18 is not changed, and it remains in the contracted state, and the voltages of the vibrating electrode 14, fixed electrode 16, and movable electrode 22 are respectively 45 V, 0 V, and 0 V. As a result, an electrostatic force acts between the movable electrode 22 and the vibrating electrode 14, and the movable electrode 22 is attracted to the vibrating electrode 14.

In the process from time t2 to time t3, since the applied voltage of the piezoelectric vibrator 18 changes from 45 V to 0 V, the piezoelectric vibrator 18 changes from the contracted state to the expanded state, and the vibrating member 12 is displaced by this changing portion. At this time, the voltages of the vibrating electrode 14, fixed electrode 16, and movable electrode 22 are not changed, and hence the movable electrode 22 remains attracted to the vibrating electrode 14. Accordingly, since the friction between the movable member 20 and the vibrating member 12 becomes greater than the friction between the movable member 20 and the fixed substrate 10, the movable member 20 is displaced together with the vibrating member 12, and is displaced from the fixed substrate 10 by about 1 micron in the direction of arrow A in FIG. 1.

In the process from time t3 to time t4, the applied voltage of the piezoelectric vibrator 18 is not changed, and it remains in the expanded state, and the voltages of the vibrating electrode 14, fixed electrode 16, and movable electrode 22 are respectively 45 V, 0 V, and 45 V. As a result, an electrostatic force acts between the movable electrode 22 and the vibrating electrode 14, and the movable electrode 22 is attracted to the fixed electrode 16.

The state at time t4 is same as the state at time t0, and hence the next process is same as the process from time t0 to time t1. Therefore, by periodically repeating the process from time t0 to time t4, the movable member 20 can be advanced from the fixed substrate 10 in the direction of arrow A in FIG. 1.

Thus, by applying to the movable member 20 the voltage pulse such that the voltage of the movable electrode 22 is 45 V in the process of increasing the applied voltage of the piezoelectric vibrator 18, and the voltage of the movable electrode 22 is 0 V in the process of decreasing the applied voltage of the piezoelectric vibrator 18, the movable member 20 can be advanced in the direction of arrow A in FIG. 1.

Next, a case of retreat of the movable member 20 will be explained. Retreat is the movement in the reverse direction of arrow A in FIG. 1. To retreat the movable member 20, the voltage of the movable electrode 22 is 0 V in the process of increasing the applied voltage of the piezoelectric vibrator 18, and the voltage of the movable electrode 22 is 45 V in the process of decreasing the applied voltage of the piezoelectric vibrator 18. This operation will be explained below.

In the process from time t0 to time t1, since the applied voltage of the piezoelectric vibrator 18 changes from 0 V to 45 V, the piezoelectric vibrator 18 changes from the expanded state to the contacted state, and the vibrating member 12 is displaced by this changing portion. At this time, the voltages of the vibrating electrode 14, fixed electrode 16, and movable electrode 22 are respectively 45 V, 0 V, and 0 V, so that an electrostatic force acts between the movable electrode 22 and the vibrating electrode 14, and the movable electrode 22 is attracted to the vibrating electrode 14. Accordingly, the friction between the movable member 20 and the vibrating member 12 becomes greater than the friction between the movable member 20 and the fixed substrate 10. As a result, the movable member 20 is displaced together with the vibrating member 12, and is displaced from the fixed substrate 10 by about 1 micron in the reverse direction of arrow A in FIG. 1.

In the process from time t1 to time t2, the applied voltage of the piezoelectric vibrator 18 is not changed, and it remains in the contracted state, the voltages of the vibrating electrode 14, fixed electrode 16, and movable electrode 22 are respectively 45 V, 0 V, and 45 V. Therefore, an electrostatic force acts between the movable electrode 22 and the fixed electrode 16, and the movable electrode 22 is attracted to the fixed electrode 16.

In the process from time t2 to time t3, since the applied voltage of the piezoelectric vibrator 18 changes from 45 V to 0 V, the piezoelectric vibrator 18 changes from the contracted state to the expanded state, and the vibrating member 12 is displaced by this changing portion. At this time, since the voltages of the vibrating electrode 14, fixed electrode 16, and movable electrode 22 are not changed, the movable electrode 22 remains attracted to the fixed electrode 16. Accordingly, the friction between the movable member 20 and the fixed substrate 10 becomes greater than the friction between the movable member 20 and the vibrating member 12. Therefore, even if the vibrating member 12 is displaced, the movable member 20 is not displaced from the fixed substrate 10.

In the process from time t3 to time t4, the applied voltage of the piezoelectric vibrator 18 is not changed, and it remains in the expanded state, and the voltages of the vibrating electrode 14, fixed electrode 16, and movable electrode 22 are respectively 45 V, 0 V, and 0 V. As a result, an electrostatic force acts between the movable electrode 22 and the vibrating electrode 14, and the movable electrode 22 is attracted to the vibrating electrode 14.

The state at time t4 is same as the state at time t0, and hence the next process is same as the process from time t0 to time t1. Therefore, by periodically repeating the process from time t0 to time t4, the movable member 20 can be driven in the reverse direction of the arrow A in FIG. 1 with respect to the fixed substrate 10.

Thus, by applying voltages pulses to the movable electrode 22 such that the voltage of the movable electrode 22 is 0 V in the process of increasing the applied voltage of the piezoelectric vibrator 18, and that the voltage of the movable electrode 22 is 45 V in the process of decreasing the applied voltage of the piezoelectric vibrator 18, it can be driven in the reverse direction of the arrow A in FIG. 1.

A case of stopping the movable member 20 will be explained. In this case, the same voltage of 45 V as in the vibrating electrode 14 is applied to the movable electrode 22. Therefore, regardless of the state of the piezoelectric vibrator 18, an electrostatic force is almost always acting between the movable electrode 22 and the fixed electrode 16, while an electrostatic force does not act between the movable electrode 22 and the vibrating electrode 14. Hence, even if the vibrating member 12 vibrates, the movable member 20 is attracted to the fixed substrate 10 and remains stopped still on the fixed substrate 10.

Incidentally, when the same voltage of 0V as in the fixed electrode 16 is applied to the movable electrode 22, an electrostatic force is almost always acting between the movable electrode 22 and the vibrating electrode 14, while an electrostatic force does not act between the movable electrode 22 and the fixed electrode 16. Accordingly, in this case, the movable member 20 is attracted to the vibrating member 12, and only vibrates together with the vibrating member 12 in an amplitude of 1 micron, and hence is not driven by steps. Therefore, in an application where such vibration has actual ill effect, the movable member 20 can be substantially stopped.

Thus, by vibrating the piezoelectric vibrator 18 steadily to apply a specific voltage to the fixed electrode 16 and vibrating electrode 14, and applying a pulse synchronized with the vibration of the piezoelectric vibrator 18 to the movable electrode 22 to control its phase, the movable member 20 is made to advance or retreat. By applying a specific voltage to the movable electrode 22, the movable member 20 can be stopped.

Since the vibrating electrode 14 and fixed electrode 16 are extended parallel in the moving direction of the movable member 20, along with the movement of the movable member 20, the facing area of the bottom of the movable member 20 and fixed electrode 16 and the facing area of the bottom of the movable member 20 and vibrating electrode 14 are not changed. Therefore, the electrostatic force between the movable electrode 22 and the vibrating electrode 14 or fixed electrode 16 does not depend on the position of the movable member 20, so that stable driving is realized. The movable range of the movable member 20 is determined by the length of the vibrating electrode 14 and fixed electrode 16, and is not limited by the size of the movable member 20.

In this embodiment, the applied voltage of the piezoelectric vibrator 18 is 45 V, the applied voltage of the vibrating electrode 14 is 45 V, and the applied voltage of the movable electrode 22 is voltage pulse with amplitude of 45 V or 0 V. However, these voltage values may be varied according to the characteristics of the piezoelectric vibrator 18, size or mass of the movable member 20, and other conditions.

In the embodiment, the applied voltage pulse to the piezoelectric vibrator 18 may be modified into sinusoidal wave or square wave, or other changes are possible within a scope not departing from the driving process.

As explained herein, according to the second embodiment, the movable member 20 is displaced only in the running direction in a state contacting with the fixed substrate 10 and vibrating member 12. As compared with a conventional electrostatic actuator which is displaced while repeating attraction to the facing upper and lower electrodes, the distance between operating electrodes is shorter, so that a movable member of a greater mass can be driven by the same voltage. In addition, in the embodiment, the actuator has only one movable member 20, but since displacement of the movable member can be controlled by the voltage of the movable member only, plural movable members may be disposed on the same fixed electrode 16 and vibrating electrode 14 and can be driven independently Also in this case, the piezoelectric vibrator 18 is not required in a plurality, and therefore even if plural movable members are used, the actuator is not increased so much in size, and the power consumption does not increase in proportion to the number of movable elements.

To stop the movable member 20, alternatively, the voltage pulse applied to the piezoelectric vibrator 18 may be suspended to stop the vibrating member 12. Also in this case, the voltage may be applied between the movable electrode 22 and any one of fixed electrode 16 and vibrating electrode 14, and the movable member 20 is preferred to be attracted to the fixed substrate 10 or vibrating member 12.

[Third Embodiment]

In a third embodiment of the invention, the actuator in the first embodiment has two movable members, and several other members are combined, and it is designed to function as a small-sized imaging module. Hence, elements having same functions are identified with same reference numerals as in the first embodiment.

Figure 8:
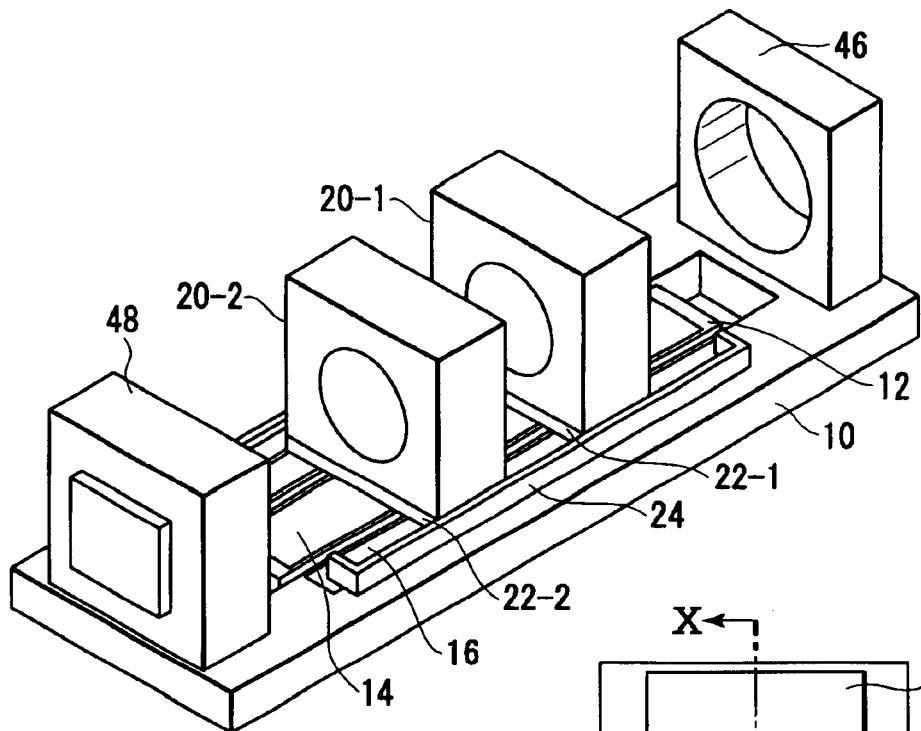
FIG. 8 is a perspective view of an imaging module applying an actuator according to a third embodiment of the invention.
Figure 9:
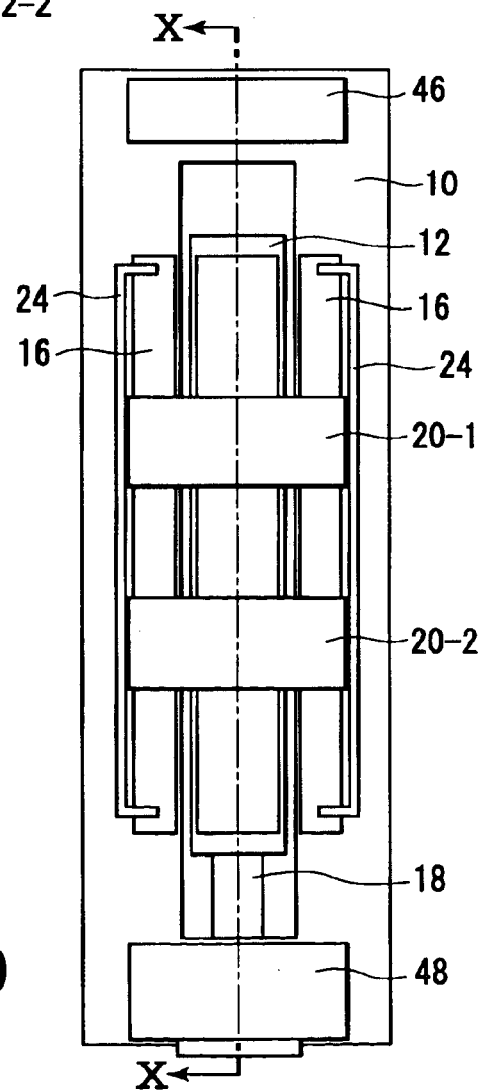
FIG. 9 is a top view of the imaging module applying the actuator according to the third embodiment.

FIGS. 8 and 9 show a perspective view and a top view of an imaging module using the actuator of the embodiment. In this embodiment, a first movable member 20-1 and a second movable member 20-2 which are functioning as a lens frame are disposed. A front fixed lens frame 46 is fixed to the fixed substrate 10 ahead of the first movable member 20-1 by adhering to the fixed substrate 10. Similarly, a rear fixed lens frame 48 is fixed to the fixed substrate 10 behind the second movable member 20-2 by adhering to the fixed substrate 10.

Figure 10:
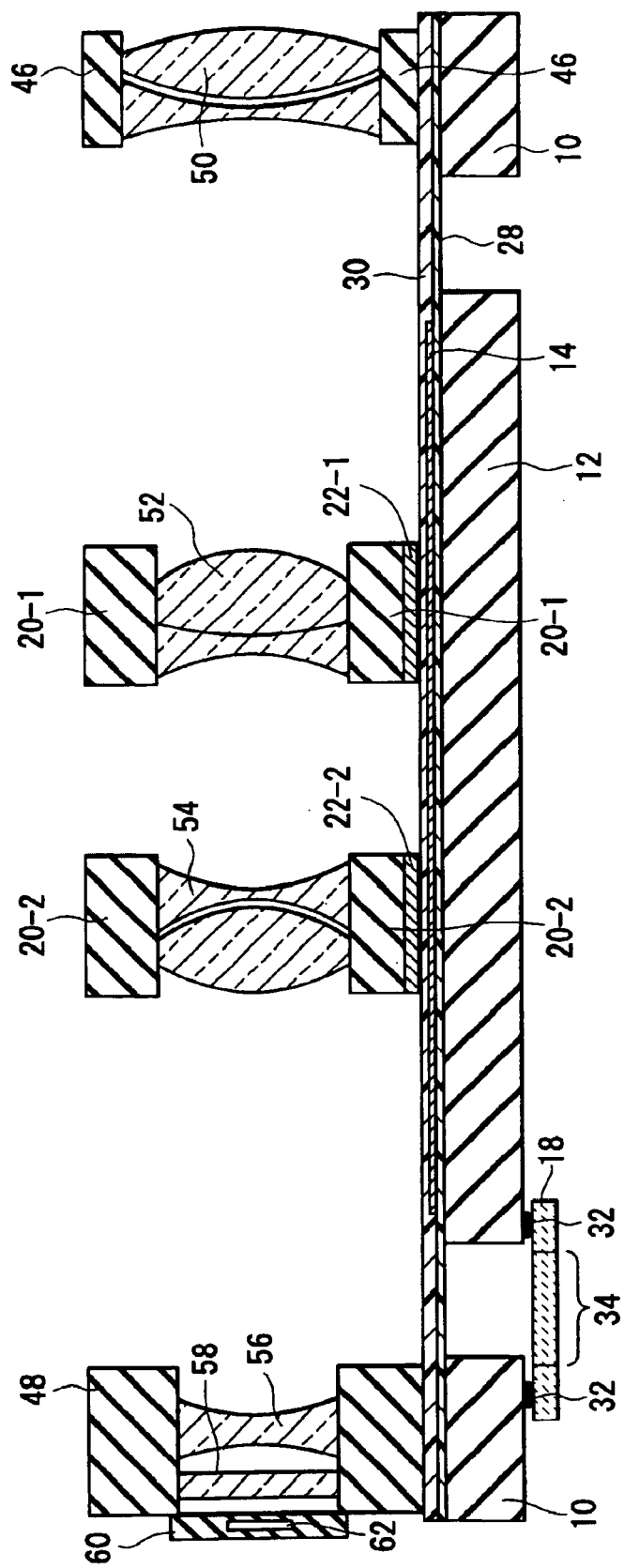
FIG. 10 is a sectional view taken along line X—X in FIG. 9.

FIG. 10 is a sectional view taken along line X—X in FIG. 9. The front fixed lens frame 46, first movable member 20-1, second movable member 20-2, and rear fixed lens frame 48 are individually provided with circular openings. In these openings, a first lens group 50, a second lens group 52, a third lens group 54, and a fourth lens group 56 are disposed, respectively. Further, behind the fourth lens group 56 in the rear fixed lens frame 48, a low pass filter 58 and a solid state imaging device package 60 are fixed. A solid state imaging device 62 is disposed in the solid state imaging device package 60.

Same as in the case of the first embodiment, although not particularly shown in the drawing, wirings are drawn out from the fixed electrode 16, vibrating electrode 14, first movable member 20-1, and second movable member 20-2, and the voltage can be controlled independently by an external power source.

Figure 6:
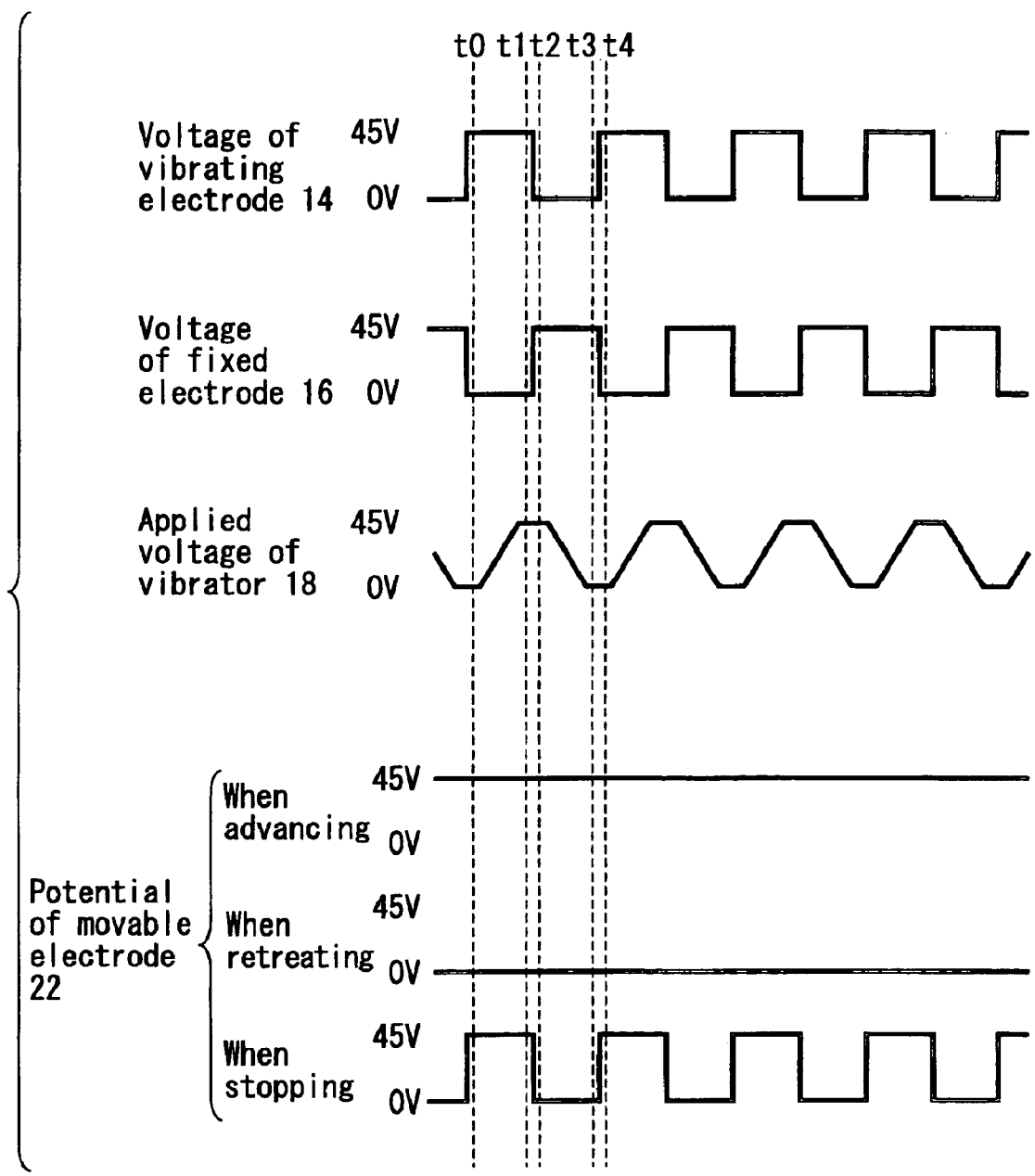
FIG. 6 is a timing chart explaining a method of driving the actuator according to the first embodiment.
Figure 7:
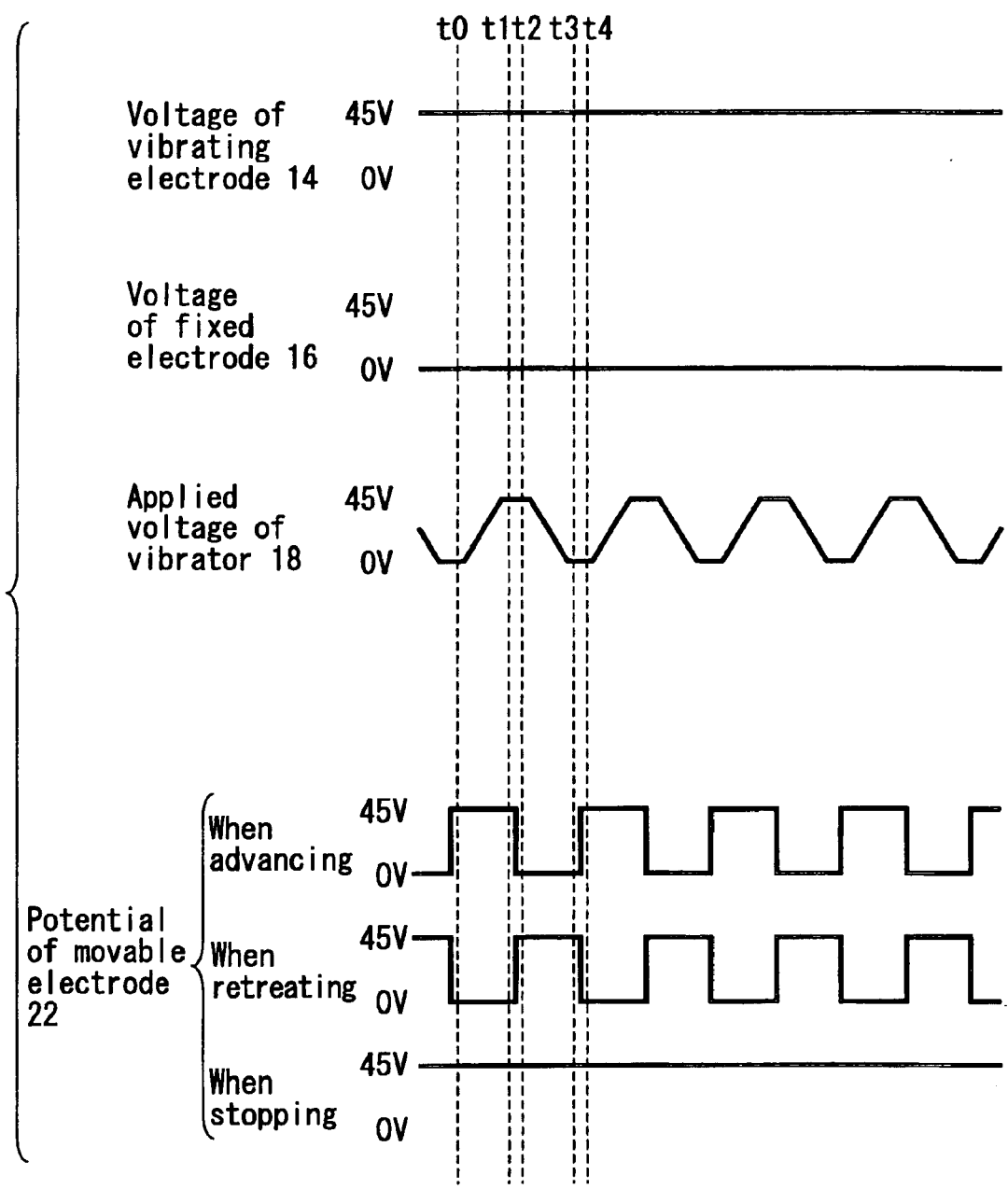
FIG. 7 is a timing chart explaining a method of driving an actuator according to a second embodiment of the invention.

As explained in FIG. 6 relating to the first embodiment and FIG. 7 relating to the second embodiment, the actuator of this embodiment is also capable of controlling advancing, retreating and stopping operations by the voltage or voltage pulse applied to the movable members 20-1, 20-2. By applying individual potentials to the first movable member 20-1 and second movable member 20-2, and by preparing potential difference applying means for applying a potential difference between the movable electrodes 22-1, 22-2 and the fixed electrode 16 and vibrating electrode 14, they can be driven independently In this embodiment, the piezoelectric vibrator 18 is disposed at the rear side of the fixed substrate, but also in this case, same as explained in the first embodiment, the movable members 20-1, 20-2 can be driven.

Herein, the first lens group 50 to fourth lens group 56 compose a zoom optical system, using the solid state imaging device 62 as the focal plane, and the second lens group 52 and third lens group 54 as movable groups.

Thus, in this embodiment, by disposing all lens groups 50 to 56 on the fixed substrate 10, a very compact imaging module is realized. The embodiment has two groups of movable members, but may also have three or more groups without particularly increasing the number of piezoelectric vibrators 18. To simplify the drawing, the guide rail 24 is shown to restrain only the movement in the lateral direction of the movable lens frame in FIG. 9. In an application required to assume the imaging module to be laid, it is also required to restrain the upper side of the movable members 20-1, 20-2.

In this embodiment, the movable member is used as the lens frame, and the lens or lens group is disposed in the movable member. However, various optical elements such as a solid state imaging device, prism or mirror can be fixed and disposed in the movable member. They can be also fixed in the fixed substrate 10.

[Fourth Embodiment]

In the first embodiment, the piezoelectric vibrator 18 is used for vibrating the vibrating member 12. In a fourth embodiment of the invention, a comb tooth electrostatic actuator integrally formed in the fixed electrode 16 and vibrating member 12 is used. In explanation of the embodiment, elements having same functions as in the first embodiment are identified with same reference numerals for the sake of simplicity of explanation.

Figure 11:
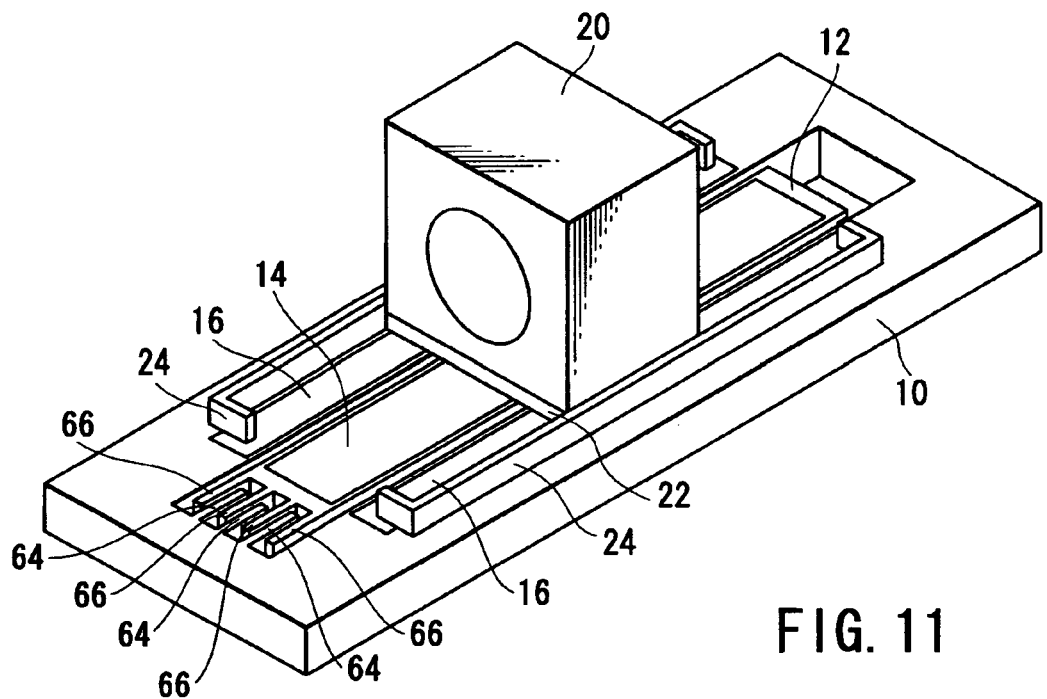
FIG. 11 is a perspective view of an actuator according to a fourth embodiment of the invention.
Figure 12:
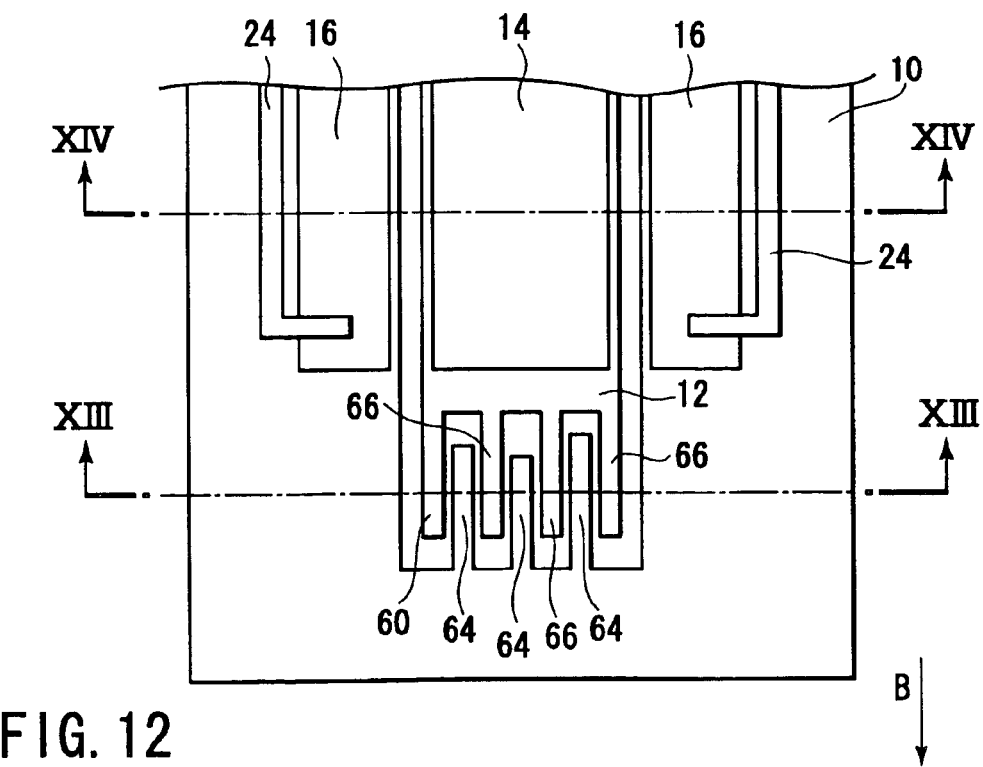
FIG. 12 is an enlarged top view of a comb tooth electrode.

The actuator in this embodiment is composed of comb tooth electrodes 64 and 66 mutually facing the fixed electrode 10 and vibrating member 12 respectively as shown in FIG. 11. FIG. 12 is a magnified top view of the comb tooth electrodes 64, 66. Sectional views taken along line XIII—XIII and line XIV—XIV shown in FIG. 12 are shown respectively in FIGS. 13 and 14. Herein, the fixed substrate 10 and vibrating member 12 are electrically insulated from the vibrating electrode 14 and fixed electrode 16 by a resin thin film 28. Therefore, voltage can be applied to the comb tooth electrodes 64 and 66 independently from these potentials. In the drawing, the extension length of each comb tooth electrode 64 is shown to be different. The length of the individual comb tooth electrodes 64 is not particularly specified, but may be either mutually different or all may be in the same length.

Figure 13:
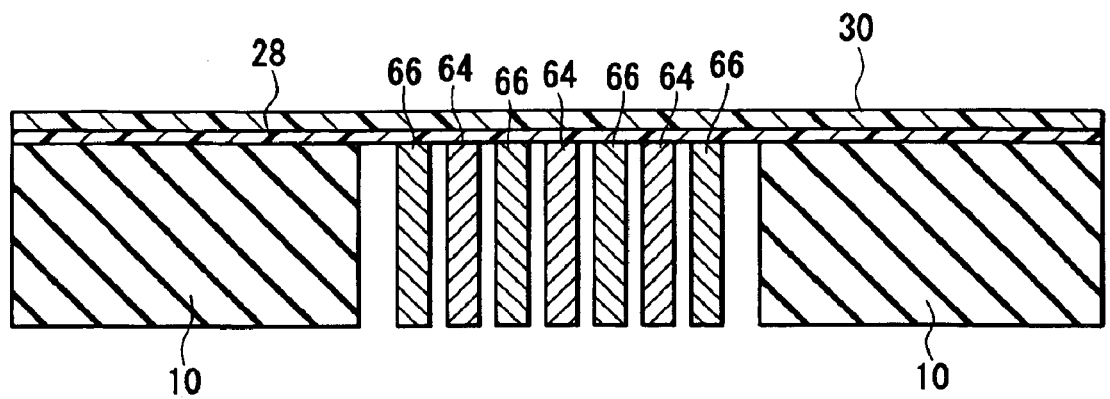
FIG. 13 is a sectional view taken along line XIII—XIII in FIG. 12.
Figure 14:
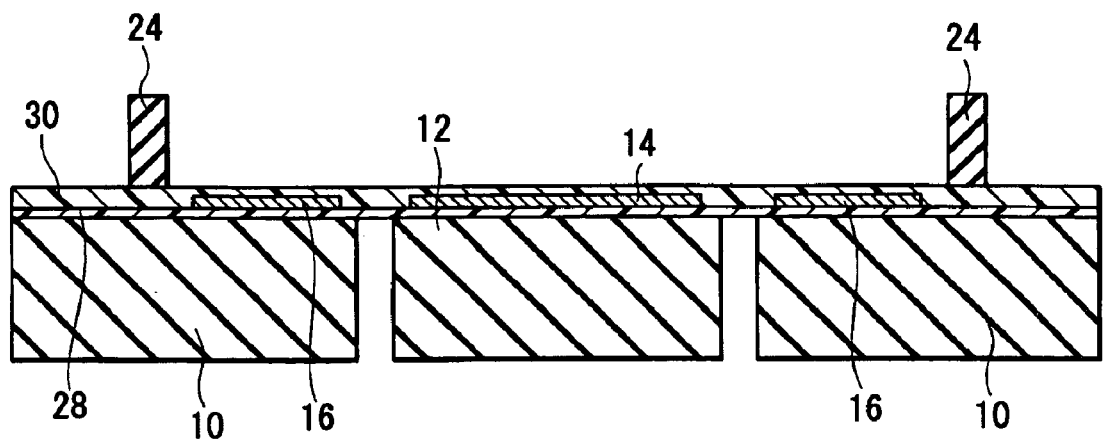
FIG. 14 is a sectional view taken along line XIV—XIV in FIG. 12.

As known from FIGS. 13 and 14, the vibrating member 12 is supported on the square opening of the fixed substrate 10 by the lower layer resin thin film 28 and upper layer resin thin film 30. By applying a voltage between the fixed substrate 10 and the vibrating member 12, the comb tooth electrode 64 of the fixed substrate 10 and the comb tooth electrode 66 of the vibrating member 12 function as comb tooth electrostatic actuators. As a result, the vibrating member 12 is displaced in the direction of arrow B in FIG. 12. Thereafter, when the potential is set to 0 V, by the elasticity of elastic members of the lower layer resin thin film 28 and upper layer resin thin film 30, the vibrating member 12 returns to the original position. By applying a voltage pulse between the fixed substrate 10 and the vibrating member 12, same as when the piezoelectric vibrator 18 is used in the first embodiment, the vibrating member 12 is vibrated on the fixed substrate 10. Therefore, same as in the first embodiment and second embodiment, the movable member 20 can be driven by steps.

In this embodiment, as explained herein, the comb tooth electrostatic actuator for vibrating the vibrating member 12 is formed integrally with the fixed substrate 10 and vibrating member 12. Therefore, as compared with the first embodiment in which the piezoelectric actuator composed of the laminated piezoelectric vibrator 18 is bonded as a separate component, it is preferably used in an application demanding smaller size, in particular. On the other hand, since the piezoelectric actuator is greater in generated power as compared with the electrostatic actuator, it is preferred in an application for driving multiple movable members of relatively large mass.

In the embodiment, only one movable member 20 is used, but it can be similarly applied in the case of using two or more movable members as in the third embodiment.

Preferably, at least one surface of the two comb tooth electrodes 64, 66 should be covered with an insulator so as to be insulated mutually.

In this embodiment, the vibrating member 12 is vibrated by the electrostatic actuator composed of the comb tooth electrode 66 as the first driving electrode disposed on the vibrating member 12 and the comb tooth electrode 64 as the second driving electrode disposed on the fixed substrate 10. However, the shape of the first and second driving electrodes is not limited to the comb tooth shape, but may be formed in any shape as long as an electrostatic force can be generated in a desired direction.

[Fifth Embodiment]

Figure 15:
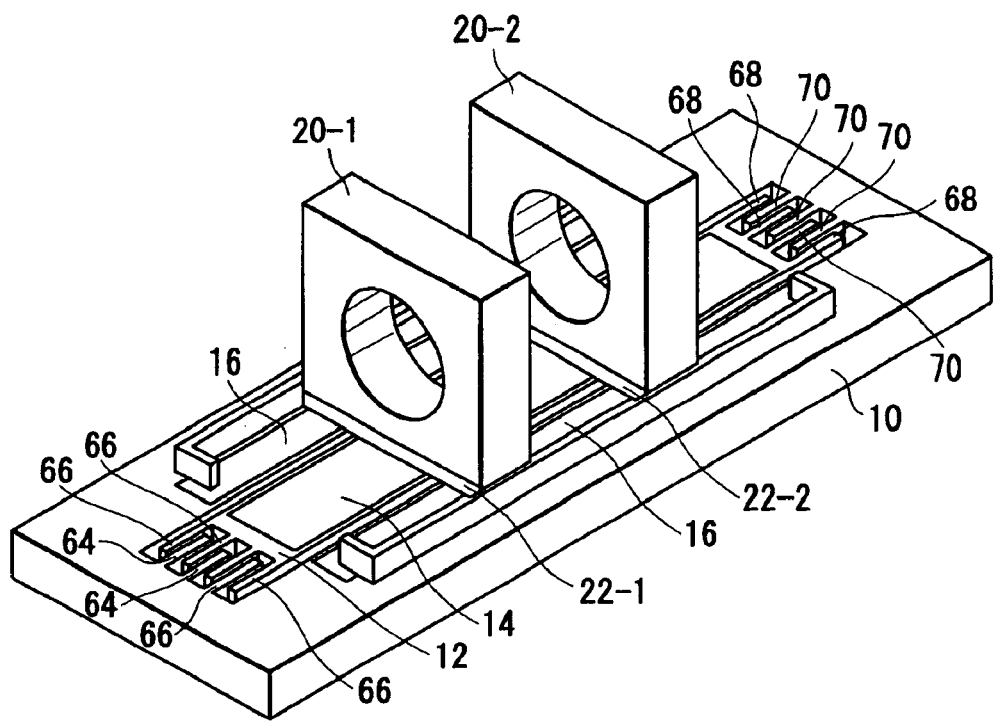
FIG. 15 is a perspective view of an actuator according to a fifth embodiment of the invention.

In the fourth embodiment, the comb tooth electrostatic actuator for vibrating the vibrating member 12 is disposed only at one end of the vibrating member 12. In a fifth embodiment of the invention, as shown in FIG. 15, the comb tooth electrostatic actuator is disposed at both ends of the vibrating member 12. In the fourth embodiment, one movable member 20 was used, but two movable members 20-1, 20-2 are used in this embodiment. Other parts are same as in the fourth embodiment. In explanation of the embodiment, elements having same functions as in the fourth embodiment are identified with same reference numerals for the sake of simplicity of explanation.

Same as in the fourth embodiment, a comb tooth electrode 66 is formed at one end of the vibrating member 12, and a confronting comb tooth electrode 64 is formed on the fixed substrate 10. In the actuator of this embodiment, further, another comb tooth electrode 68 is formed at other end of the vibrating member 12, and a confronting comb tooth electrode 70 is formed on the fixed substrate 10. Accordingly, the comb tooth electrode 64 and comb tooth electrode 66 compose a first comb tooth electrostatic actuator, and the comb tooth electrode 70 and comb tooth electrode 68 compose a second comb tooth electrostatic actuator.

By grounding the comb tooth electrodes 66 and 68 at the vibrating member 12 side, for example, and applying a high voltage alternately to the comb tooth electrodes 64 and 70 at the fixed substrate 10 side, the vibrating member 12 can be vibrated on the fixed substrate 10. Herein, the vibrating member 12 is supported on the fixed substrate 10 by resin thin films 28 and 30 (not shown) same as in the fourth embodiment. The generated forces by the first comb tooth electrostatic actuator and second comb tooth electrostatic actuator must be sufficiently greater than the elastic restoring forces of these resin thin films 28 and 30.

As explained herein, as compared with the fourth embodiment in which the vibration of the vibrating member 12 depends on the elastic restoring forces of the resin thin films 28 and 30, in this embodiment, it is driven by the pair of confronting comb tooth electrostatic actuators. Accordingly, against a greater load, the vibration of the vibrating member 12 can be maintained. Therefore, as compared with the fourth embodiment, the actuator of this embodiment is particularly suitable to an application for driving multiple movable members or driving a movable member of a relatively large mass.

[Sixth Embodiment]

A sixth embodiment of the invention refers to a method of integrating the position detecting function of the movable member of the actuator of the invention.

Figure 16:
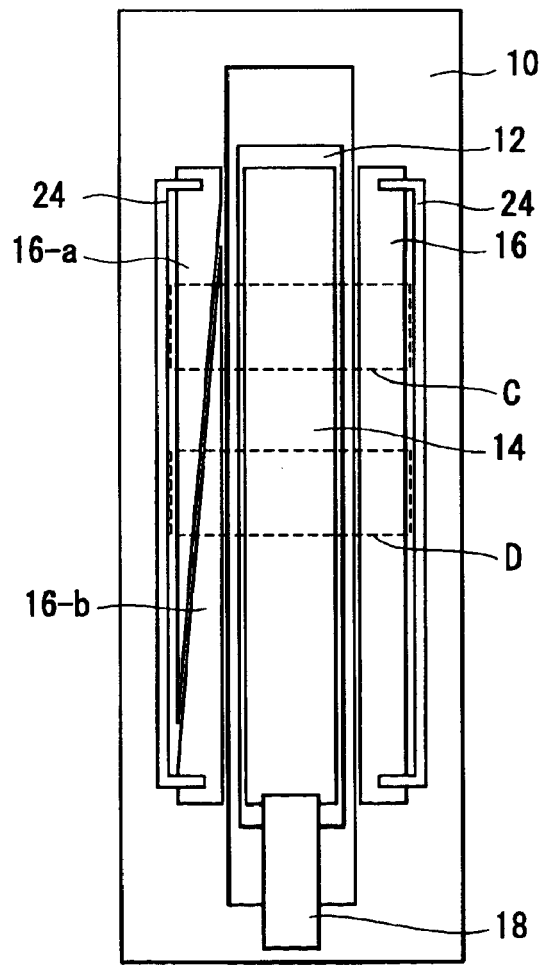
FIG. 16 is a top view of an actuator according to a sixth embodiment of the invention.

The configuration of the actuator of the embodiment is similar to that of the first embodiment as shown in FIG. 16. Same functional elements are identified with same reference numerals as in FIG. 2. For the sake of simplicity, the movable element 20 is not shown.

What differs from the first embodiment is that the left side fixed electrode is divided in two regions (fixed electrodes **16-*a* and 16-*b*). In these electrodes as well as the right side fixed electrode 16, the same voltage is applied when driving the actuator. Further, an external circuit (not shown) is provided for measuring the electrostatic capacity between the movable member 20 (not shown in FIG. 16) and the divided fixed electrode 16-*a*. Herein, the fixed electrode 16-*a* varies in the area facing the movable electrode 22 in the moving direction of the movable member 20. Therefore, when the movable member 20 moves from the position of broken line C to the position of broken line D in the drawing, the electrostatic capacity between the fixed electrode 16-*a* and movable electrode 22 is increased. Since the electrostatic capacity between the fixed electrode 16-*a* and the movable electrode 22 is determined by the position of the movable electrode 22, by measuring it, the position of the movable member 20 can be detected. In the fixed electrode 16-*b*, on the other hand, the same voltage as in the fixed electrode 16-*a* is applied. Therefore, by forming the region separating the fixed electrodes 16-*a* and 16-*b* in a sufficiently narrow area, when driving the actuator, the same electrostatic force as in the first embodiment may be substantially obtained. In this embodiment, the fixed electrode 16 is divided, but the same effects are obtained also by dividing the vibrating electrode 14**.

In the embodiment, as described herein, the position detecting function can be integrated only by slightly modifying the electrode composition of the actuator, so that the size can be reduced as compared with the actuator combined with a separate optical or magnetic sensor.

Instead of dividing the fixed electrode 16, the fixed electrode may be designed to be variable in the area facing the movable electrode 22 in the moving direction of the movable member 20.

In the embodiment, the position is detected by simply measuring the electrostatic capacitance between the movable electrode 22 and the fixed electrode **16-*a*. In this method, however, there is a strong effect of fluctuation of the interval between the fixed electrode 16-*a* and the movable electrode 22 or variation of ambient temperature, so that lowering of precision of position detection is inevitable. To avoid this problem, it is effective to measure the difference between the capacitance between the movable electrode 22 and fixed electrode 16-*a* and the capacitance between the movable electrode 22 and fixed electrode 16-*b***.

Figure 17:
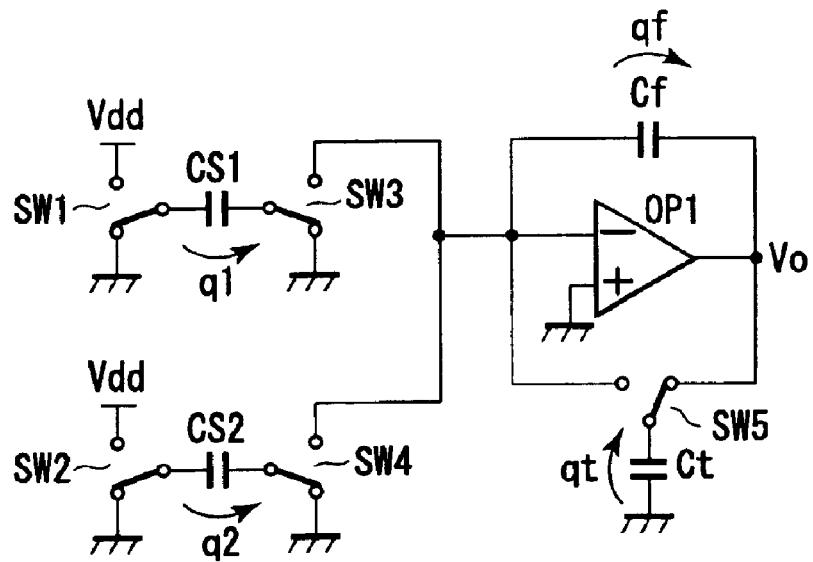
FIG. 17 is a circuit diagram of a switched capacitor circuit.

As an external circuit for measuring the difference in capacitance, for example, a circuit using a switched capacitor may be used. A switched capacitor comprises, as shown in FIG. 17, a first switch SW1 for changing over one end of a first capacitor CS1 between the reference voltage Vdd and the ground; a second switch SW2 for changing over one end of a second capacitor CS2 between the reference voltage Vdd and the ground; a third switch SW3 for changing over other end of the first capacitor CS1 between an inverting input terminal of an operational amplifier OP1 to which its non-inverting input terminal is grounded and the ground; a fourth switch SW4 for changing over other end of the second capacitor CS2 between the inverting input terminal of the operational amplifier OP1 and the ground; a capacitor Cf connected between the output terminal and the inverting input terminal of the operational amplifier OP1; a capacitor Ct having one end grounded; and a fifth switch SW5 for changing over the other end of the capacitor Ct between the output terminal and the inverting input terminal of the operational amplifier OP1. By changing over these switches, the output voltage Vo of the operational amplifier OP1 is determined according to the difference in electrostatic capacity between the first capacitor CS1 and the second capacitor CS2.

The principle of detecting the difference in electrostatic capacity by the switched capacitor depending on the state of the switches will be explained below.

In the first place, the first to fourth switches SW1 to SW4 are connected to the ground side, and the fifth switch SW5 is changed over to the output terminal side of the operational amplifier OP1. This state is called an input reset state. In this state, the electric charge q1 of the first capacitor CS1 is 0, the electric charge q2 of the second capacitor CS2 is 0, the electric charge qf of the capacitor Cf is Cf·Vo(n), and the electric charge qt of the capacitor Ct is Ct·Vo(n). Herein, Vo is the output voltage of the operational amplifier OP1. The switched capacitor operates in a pattern comprising several states, and each pattern is identified with subscript (n).

From the input reset state, the second switch SW2 is changed over to the reference voltage Vdd side to be set in a charging state. In the charging state, the second capacitor CS2 is charged, and its electric charge q2 becomes −CS2·Vdd.

Figure 18:
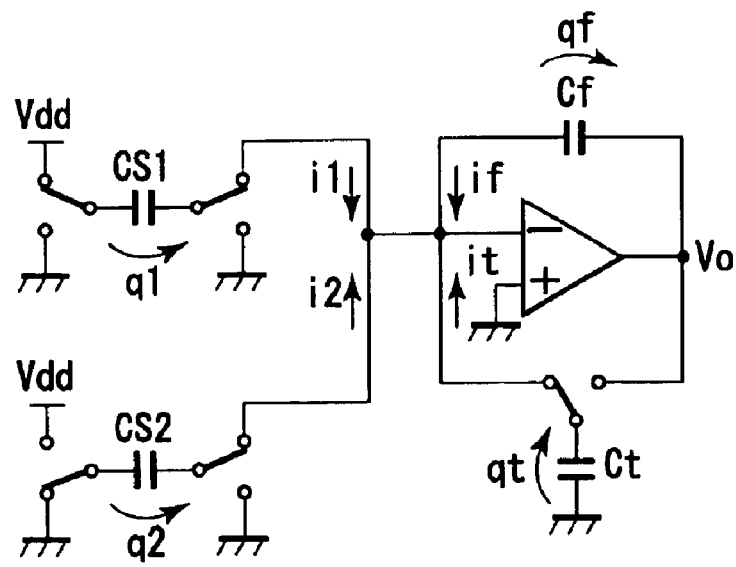
FIG. 18 is a circuit diagram showing an output state of the switched capacitor circuit.

Next, the first switch SW1 is changed to the reference voltage Vdd side, the second switch SW2 is changed to the ground side, and the third to fifth switches SW3 to SW5 are changed to the inverting input terminal side of the operational amplifier OP1 to be set in an output state. In this output state, an electric current as shown in FIG. 18 flows into the inverting input terminal of the operational amplifier OP1, and the electric charges of the capacitors are changed as follows:

$$q1 = \int i1 dt = CS1 \cdot Vdd$$

$$q2 = \int i2 dt = -CS2 \cdot Vdd$$

$$qf = \int if dt = Cf\{Vo(n+1) - Vo(n)\}$$

$$qt = \int it dt = Ct \cdot Vo(n)$$

Herein, since the algebraic sum of the currents is 0, the following formula (1) is established.

$$q1 + q2 + qf + qt = CS1 \cdot Vdd - CS2 \cdot Vdd + CF\{Vo(n+1) - Vo(n)\}Ct \cdot Vo(n) \quad (1)$$

Hence, $$Cf \cdot Vo(n+1) = (CS1 - CS2)Vdd + (cf - Ct)Vo(n) \quad (2)$$

From formula (2), supposing Cd=Ct, the output voltage Vo in the output state of the switched capacitor is always expressed in the following formula (3):

$$Vo = (CS1 - CS2)Vdd/Cf \quad (3)$$

As expressed in the formula (3), the difference in electrostatic capacity between the first capacitor CS1 and the second capacitor CS2 can be calculated from the output voltage value of the switched capacitor circuit.

The switched capacitor circuit can be further changed from this output state to an output charging state by changing over the switches same as in the input reset state, and to an output reset state by changing over only the fifth switch SW5 to the inverting input terminal side of the operational amplifier OP1, so that the output voltage can be reset. Herein, the output charging state is stable in the output state of the output voltage, and is an optimum timing for sampling.

Thus, the switched capacitor circuit can measure the difference in electrostatic capacity between two capacitors, and by using the first capacitor CS1 as the capacitor composed of the movable electrode 22 and fixed electrode 16-*a* and the second capacitor CS2 as the capacitor composed of the movable electrode 22 and fixed electrode 16-*b*, the position of the movable member 20 can be determined from the output voltage Vo of the switched capacitor circuit corresponding to the difference in electrostatic capacity between the two.

In this configuration for determining the capacity difference, the position can be detected at high precision by suppressing the effect of fluctuation of the interval between the fixed electrodes 16-*a*, 16-*b* and movable member 20 or variation of ambient temperature.

Instead of measuring the difference in electrostatic capacity, the same effects are obtained by measuring the ratio of electrostatic capacities.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An actuator comprising:
   a substrate extended in a predetermined direction;
   a vibrating member supported on the substrate vibratably in the predetermined direction;
   a vibration generating portion configured to vibrate the vibrating member in the predetermined direction;
   a movable member having a first facing surface confronting the substrate and a second facing surface confronting the vibrating member;
   a movable electrode disposed at any one of the first facing surface and second facing surface of the movable member; and
   a counter electrode disposed on any one of the substrate and the vibrating member so as to confront the movable electrode, wherein
   a potential difference is applied between the movable electrode and the counter electrode to cause an electrostatic force to act such that an apparent friction between the vibrating member and the movable member is greater than an apparent friction between the substrate and the movable member when displacing the vibrating member in a desired direction relatively on the substrate by vibrating in the predetermined direction, and thereby the movable member is relatively moved in the desired direction on the substrate.

2. The actuator according to claim 1, wherein a potential difference is applied between the movable electrode and the counter electrode to cause an electrostatic force to act such that an apparent friction between the substrate and the movable member is greater than an apparent friction between the vibrating member and the movable member, and thereby the movable member is stopped on the substrate.

3. The actuator according to claim 1, wherein the potential difference between the counter electrode and the movable electrode varies in synchronism with the vibration of the vibrating member.

4. The actuator according to claim 3, wherein a potential varying in synchronism with the vibration of the vibrating member is applied to any one electrode of the counter electrode and the movable electrode, and a fixed potential is applied to the other electrode.

5. The actuator according to claim 3, wherein there is a moment at which the potential difference between the counter electrode and the movable electrode becomes 0 in synchronism with the vibration.

6. The actuator according to claim 1, wherein a plurality of movable members each having the movable electrode disposed therein are provided, and the plurality of movable members move independently from each other.

7. The actuator according to claim 6, wherein independent potentials are applied to the movable electrodes disposed in the plurality of movable members, whereby the plurality of movable members move independently from each other.

8. The actuator according to claim 6, wherein the movable members include optical elements.

9. The actuator according to claim 8, further comprising an optical element fixed to any one of the substrate and the vibrating member.

10. The actuator according to claim 1, wherein the counter electrode is an electrode configured so that the area thereof facing the movable electrode varies depending on the position in the moving direction of the movable member, and the position of the movable member is detected by making use of variation of the facing area.

11. The actuator according to claim 10, wherein the variation of the facing area is detected by measuring the electrostatic capacity between the counter electrode and the movable electrode.

12. The actuator according to claim 1, wherein the counter electrode is an electrode divided into plural portions including a first region, the first region has a shape such that the area facing the movable electrode changes depending on the position in the moving direction of the movable member, and the position of the movable member is detected on the basis of the change in electrostatic capacity between the first region and the movable electrode.

13. The actuator according to claim 1, wherein the counter electrode is an electrode divided into plural portions including a first region and a second region, the first region and second region each have a shape such that the area facing the movable electrode changes depending on the position in the moving direction of the movable member, and the position of the movable member is detected on the basis of the change in ratio of electrostatic capacity between the first region and the movable electrode with respect to the electrostatic capacity between the second region and the movable electrode.

14. The actuator according to claim 1, wherein the vibration generating portion is configured of a piezoelectric vibrator which couples the substrate and the vibrating member.

15. The actuator according to claim 1, wherein the vibration generating portion includes:

an elastic member which couples the substrate and the vibrating member;

a first driving electrode disposed on the vibrating member; and a second driving electrode which faces the first driving electrode and disposed on the substrate so as to generate an electrostatic force in a desired direction, wherein a potential difference is applied between the first driving electrode and the second driving electrode to cause an electrostatic force to act, thereby generating vibrations.

16. The actuator according to claim 1, wherein at least one surface of the counter electrode and the movable electrode is covered with an insulator.

17. An actuator comprising:

a substrate extended in a predetermined direction;

a vibrating member supported on the substrate vibratably in the predetermined direction;

a vibration generating portion configured to vibrate the vibrating member in the predetermined direction;

a movable member having a first facing surface confronting the substrate and a second facing surface confronting the vibrating member;

a movable electrode disposed at any one of the first facing surface and second facing surface of the movable member; and a counter electrode disposed on any one of the substrate and the vibrating member so as to confront the movable electrode, wherein a potential difference is applied between the movable electrode and the counter electrode in synchronism with the vibration of the vibrating member, and by using the generated electrostatic force, the movable member is moved relatively on the substrate in a desired direction.

18. An actuator comprising:

a substrate extended in a predetermined direction;

a vibrating member supported on the substrate vibratably in the predetermined direction;

a vibration generating portion configured to vibrate the vibrating member in the predetermined direction;

a movable member having a first facing surface confronting the substrate and a second facing surface confronting the vibrating member;

movable electrodes disposed at the first and second facing surfaces of the movable member;

a first counter electrode disposed on the substrate so as to confront the movable electrode; and a second counter electrode disposed on the vibrating member so as to confront the movable electrode, wherein a potential difference is applied between the movable electrode and the first and second counter electrodes to cause an electrostatic force to act such that an apparent friction between the vibrating member and the movable member is greater than an apparent friction between the substrate and the movable member when displacing the vibrating member in a desired direction relatively on the substrate by vibrating in the predetermined direction, and thereby the movable member is relatively moved in the desired direction on the substrate.

19. The actuator according to claim 18, wherein voltages mutually different in phase are applied to the first counter electrode and second counter electrode.

20. The actuator according to claim 19, wherein voltages mutually reverse in phase are applied to the first counter electrode and second counter electrode.

21. The actuator according to claim 18, wherein the substrate is disposed at both sides of the vibrating member so as to enclose the vibrating member in a direction orthogonal to the vibrating direction of the vibrating member on the substrate surface, and the first counter electrode confronting the movable electrode is disposed at both sides of the vibrating member.

22. A driving method of an actuator, the actuator including a movable electrode disposed on a movable member, and a counter electrode disposed at any one of a facing surface of a substrate having the facing surface confronting the movable member and a facing surface of a vibrating member having the facing surface confronting the movable electrode and vibrating in a predetermined direction, applying a voltage to the movable electrode and the counter electrode, thereby causing the movable member to move relatively on the substrate, the driving method comprising:

displacing the vibrating member in a desired direction relatively on the substrate; and applying a potential difference between the movable electrode and the counter electrode such that an apparent friction between the vibrating member and the movable member is greater than an apparent friction between the substrate and the movable member when displacing the vibrating member relatively.

23. A driving method of an actuator, the actuator applying a controlled voltage to a movable electrode disposed on a movable member, a first counter electrode disposed at a facing surface of the substrate having the facing surface confronting the movable electrode, and a second counter electrode disposed at a facing surface of the vibrating member having the facing surface confronting the movable electrode and vibrating in a predetermined direction, thereby causing the movable member to move relatively on the substrate, the driving method comprising:

displacing the vibrating member in a desired direction relatively on the substrate; and applying a potential difference between at least the second counter electrode and the movable electrode when displacing the vibrating member relatively.

* * * * *